United States Patent [19]

Ward

[11] Patent Number: 5,753,767

[45] Date of Patent: May 19, 1998

[54] POLYMER COMPOSITION SUITABLE AS RESILIENT FLOORING OR WELDING ROD

[75] Inventor: Harry D. Ward, Lancaster, Pa.

[73] Assignee: Armstrong World Industries, Inc., Lancaster, Pa.

[21] Appl. No.: 766,329

[22] Filed: Dec. 13, 1996

[51] Int. Cl.⁶ .................... C08L 33/02; C08L 23/16
[52] U.S. Cl. .................... 525/301; 525/208; 525/211; 525/221
[58] Field of Search .................... 525/301, 208, 525/211, 221

[56] References Cited

U.S. PATENT DOCUMENTS

| | | | |
|---|---|---|---|
| 4,429,076 | 1/1984 | Saito et al. | 525/57 |
| 4,434,261 | 2/1984 | Brugel et al. | 524/109 |
| 4,871,810 | 10/1989 | Saltman | 525/133 |
| 4,968,752 | 11/1990 | Kawamoto et al. | 525/194 |
| 5,091,459 | 2/1992 | Howe | 524/456 |
| 5,155,157 | 10/1992 | Statz et al. | 524/423 |
| 5,206,294 | 4/1993 | Dawson | 525/196 |
| 5,310,787 | 5/1994 | Kutsuwa et al. | 524/513 |
| 5,395,881 | 3/1995 | Spelthann | 525/63 |
| 5,434,217 | 7/1995 | Spelthann | 525/63 |
| 5,565,524 | 10/1996 | Hamada et al. | 525/208 |

FOREIGN PATENT DOCUMENTS

WO9508593  3/1995  WIPO.

*Primary Examiner*—Irina S. Zemel

[57] ABSTRACT

A thermoplastic polymer composition capable of being extruded comprises a reaction product of an ionomer and a polymer which contains a moiety which is reactive with the acid or neutralized acid group of the ionomer. The composition is sufficiently non-sticking that it can be extruded and calendered without substantial adherance to any hot metal parts. Since this thermoplastic polymer composition does not stick to hot metal parts, the composition is more than suitable as resilient flooring and welding rods.

7 Claims, No Drawings

POLYMER COMPOSITION SUITABLE AS RESILIENT FLOORING OR WELDING ROD

FIELD OF THE INVENTION

This invention relates to a thermoplastic blend which can be extruded as a welding rod for resilient flooring or processed to form resilient flooring and the thermoplastic polymer composition advantageously does not stick to the hot metal parts. As a welding rod, the thermoplastic composition is in fact heated and welded between two pieces of resilient sheet flooring to form a water-tight, sealed assembly.

BACKGROUND OF THE INVENTION

Thermoplastic polymers and blends thereof are popular materials to use when making resilient flooring and welding rods. The use of such materials is, however, limited since processing requirements necessitate that the thermoplastics be processed with hot metal parts. Many thermoplastic polymers and polymer blends stick to hot metal parts and either cause problems in processing such as caking and build-up of the polymer on the metal, or are so prone to sticking on metal that such materials cannot be processed at all.

Polyvinyl chloride, for example, is popular for such items as welding rods and resilient flooring. Formulations of polyvinyl chloride can easily be extruded without sticking to hot metal parts.

The selection of polymers and polymer blends which can be extruded and processed with hot metal parts without the severe caking and build-up of the polymer on the metal parts, however, is limited. It would be advantageous to develop a thermoplastic polymer blend which can be processed with hot metal parts and extruded without such severe problems. It would be further advantageous to develop such thermoplastic polymer blends which can provide resilient flooring and welding rods.

It is an object of the present invention to provide an easily extrudable thermoplastic polymer blend which is also suitable as welding rods and resilient flooring. The present invention also provides compositions having suitably high tensile strength, good for flooring and welding rods.

BRIEF DESCRIPTION

A thermoplastic polymer composition capable of being extruded comprises a reaction product of A) a partially neutralized ethylene (meth)acrylic acid polymer (an ionomer) and B) a polymer which contains, a moiety, which is reactive with the acid or neutralized acid group, wherein the polymer of B, is present at an amount in the range of from about 10 to about 45% by weight based on the weight of A and B combined and A, the partially neutralized ethylene (meth)acrylic acid polymer, is present at an amount of from about 90 to about 55% by weight of A and B combined, wherein further, the composition is sufficiently non-sticking that it can be extruded and calendered without substantial adherance to any hot metal parts. Slight sticking is needed for processing the compositions, particularly into floor covering sheets, but sticking which builds up composition residue is undesired. A slight residue buildup which does not interfere with processing and which can be cleaned off periodically can be tolerated and such compositions are suitable for use, although it is preferred to use a composition that leaves no residue. As can be appreciated from the examples provided herein, substantial sticking and buildup of residue which interferes with product production can be avoided by implementation of the present invention.

Since this thermoplastic polymer composition does not stick to hot metal parts the composition is more than suitable as resilient flooring and welding rods. The present compositions can be used in any of the conventional processes for preparing such resilient flooring or welding rods.

The term (meth)acrylic is used herein to indicate both the acrylic and methacrylic.

DETAILED DESCRIPTION

The compositions described herein can be used in any conventional process to form the composition into resilient floor covering sheets or welding rods. To prepare the flooring, for example, the composition is extruded into a sheet and then transferred to heated rolls. To prepare a welding rod the composition can either be molded into a rod, or extruded. Processes for the preparation of such articles are well known for both applications.

The welding rods are used to join sheets of surface coverings. Sheets of surface coverings can be welded together by placing the sheets together so that two edges abut. The abutting edges are then routed. A welding rod is placed into the routed groove, and the rod melted so that the thermoplastic polymer composition fills the groove. The shape of the groove is not critical. It may, for example, be U-shaped or pentagonal.

As previously indicated, the reactive polymer is present in an amount of from about 10 to about 45% by weight (wt.) relative to the combination of the ionomer and reactive polymer. To prepare either resilient floor covering sheets or welding rods, it is preferred that the reactive polymer be present at an amount in the range of from about 25 to 35% by wt. relative to the combination of the ionomer and reactive polymer.

Suitably the reactive moiety is present in the reactive polymer at a minimum amount of about 3% by wt. and preferably the reactive moiety is present at a minimum amount of about 6% by wt. The maximum amount of the reactive moiety is not critical. A preferred range for the presence of the reactive moiety in the reactive polymer is from about 8 to about 95% by wt.

The reactive moiety of the reactive polymer must be able to react with the acidic or neutralized acid moiety of the ionomer. Suitable reactive polymers have, as a moiety, at least one member of the group consisting of: an epoxide, an alkylating agent, an isocyanate, an aziridine, and a silane. Any polymer which contains one or more of these reactive moieties can be used.

For the welding rod and resilient floor-covering sheet, it is preferred to have at least 65% by weight of the reacted blend of the reactive polymer and ionomer present in the composition. Suitably, however, especially when the composition is to be used for other applications, the reacted blend of the reactive polymer and ionomer can be present at a minimum amount of about 25% by weight of the total composition.

One or more additives can also be used with the compositions of the present invention. The composition, for example, can include a plasticizer, pigments, processing aids, filler and non-reactive polymers which would not cause sticking to hot metal parts. Such polymers which can be added include ethylene/propylene polymer rubber, polyolefin, polyethylene terephthalate, and polyether ketone. Preferred polyolefins are polyethylene and polypropylene. A preferred ethylene/propylene polymer rubber is ethylene/propylene/diene copolymer rubber. A preferred ethylene/propylene/diene copolymer rubber is ethylene propylene/1,4-hexadiene rubber.

Such polymers can acceptably be used at an amount up to about 50% of the composition providing that their inclusion will not destroy the property of non-sticking to hot metal parts. Preferably such polymers are included at an amount up to about 35% by wt. of the composition, especially for the welding rod and resilient floor-covering sheet.

This invention may be better understood from the following examples. In the examples, all parts and percentages are by weight unless otherwise indicated.

EXAMPLES

Procedure:

Compositions were prepared and tested for sticking on a two-roll mill. Each example shows the ingredients and amounts. Examples 3–10 show compositions of the present invention. Examples 1, 2, and 11 show examples not having the proper ratio of the reactive polymer to the ionomer.

The compositions were prepared by melt mixing the ingredients together in a mixer to form a homogeneous blend. The blend was then put on a two-roll mill to be formed into a sheet material. In each example, the temperature of each roll is indicated. Comments are also given in each example for the amount and condition of: 1) roll tack and 2) the residue on the roll.

Example 1

In this example, the composition was 100% ethylene methacrylic acid ionomer. The sodium ionomer, Surlyn 8920 (Dupont) was used at 34 g (grams), and the zinc ionomer, Surlyn 9910 (Dupont) was used at 26 g. On the two roll mill, the fast roll was set at 295° F. and the slow roll was set at 274° F.

It was noted that this sample stuck to the roll so badly that it could not even be removed with a blade. Furthermore, there was too much residue left on the mill rolls. The performance was not acceptable.

Example 2

In this example, the composition was 95% ethylene methacrylic acid ionomer. The sodium ionomer, Surlyn 8920 (Dupont) was used at 33.06 g, and the zinc ionomer, Surlyn 9910 (Dupont) was used at 23.94 g. The reactive polymer, used at 5% by wt. (3 g) was the terpolymer ethylene butylacrylate glycidyl methacrylate (Elvaloy AS from Dupont). On the two roll mill, the fast roll was set at 294° F. and the slow roll was set at 274° F.

It was noted that this sample stuck to the roll so badly that it could not even be removed with a blade. Furthermore, there was too much residue left on the mill rolls. The performance was not acceptable.

Example 3

In this example, the composition was 90% ethylene methacrylic acid ionomer. The sodium ionomer, Surlyn 8920 (Dupont) was used at 31.1 g, and the zinc ionomer, Surlyn 9910 (Dupont) was used at 22.9 g. The reactive polymer, used at 10% by wt. (6 g) was the terpolymer ethylene butylacrylate glycidyl methacrylate (Elvaloy AS from Dupont). On the two roll mill, the fast roll was set at 283° F. and the slow roll was set at 265° F.

It was noted that this sample did stick to the fast roll, but it could be removed easily and cleanly with the blade. Furthermore, there was no residue at all left on the mill rolls. The performance was acceptable.

Example 4

In this example, the composition was 85% ethylene methacrylic acid ionomer. The sodium ionomer, Surlyn 8920 (Dupont) was used at 29.4 g, and the zinc ionomer, Surlyn 9910 (Dupont) was used at 21.6 g. The reactive polymer, used at 15% by wt. (9 g) was the terpolymer ethylene butylacrylate glycidyl methacrylate (Elvaloy AS from Dupont). On the two roll mill, the fast roll was set at 283° F. and the slow roll was set at 265° F.

It was noted that this sample did not stick to the rolls at all. The sample went straight through the nip easily and cleanly. It was not necessary to use the blade at all. There was absolutely no residue. The performance was acceptable.

Example 5

In this example, the composition was 80% ethylene methacrylic acid ionomer. The sodium ionomer, Surlyn 8920 (Dupont) was used at 36 g, and the zinc ionomer, Surlyn 9910 (Dupont) was used at 12 g. The reactive polymer, used at 20% by weight (12 g), was the terpolymer ethylene butylacrylate glycidyl methacrylate (Elvaloy AS from Dupont). On the two roll mill, the fast roll was set at 325° F. and the slow roll was set at 314° F.

It was noted that this sample did stick to the fast roll (probably due to the hotter roll temperature), but the sample was removed from the roll with the blade easily and cleanly. There was no residue left on the rolls. The performance was acceptable. In fact, at hotter roll temperatures, some slight sticking of the composition actually makes it more processable into sheet materials.

Example 6

In this example, the composition was 75% ethylene methacrylic acid ionomer. The sodium ionomer, Surlyn 8920 (Dupont) was used at 25.9 g, and the zinc ionomer, Surlyn 9910 (Dupont) was used at 19.1 g. The reactive polymer, used at 25% by weight (15 g), was the terpolymer ethylene butylacrylate glycidyl methacrylate (Elvaloy AS from Dupont). On the two roll mill, the fast roll was set at 325° F. and the slow roll was set at 317° F.

It was noted that this sample did stick to the fast roll, but the sample was removed from the roll over the blade. There was no residue left on the rolls. The performance was acceptable.

Example 7

In this example, the composition was 70% ethylene methacrylic acid ionomer. The sodium ionomer, Surlyn 8920 (Dupont) was used at 24.2 g, and the zinc ionomer, Surlyn 9910 (Dupont) was used at 17.8 g. The reactive polymer, used at 30% by weight (18 g), was the terpolymer ethylene butylacrylate glycidyl methacrylate (Elvaloy AS from Dupont). On the two roll mill, the fast roll was set at 325° F. and the slow roll was set at 316° F.

It was noted that this sample did stick to the fast roll, but it was noted that the sample immediately lost tack and loosened from the roll without the use of the blade. There was no residue left on the rolls. The performance was acceptable.

Example 8

In this example, the composition was 65% ethylene methacrylic acid ionomer. The sodium ionomer, Surlyn 8920

(Dupont) was used at 22.5 g, and the zinc ionomer, Surlyn 9910 (Dupont) was used at 16.5 g. The reactive polymer, used at 35% by weight (21 g), was the terpolymer ethylene butylacrylate glycidyl methacrylate (Elvaloy AS from Dupont). On the two roll mill, the fast roll was set at 326° F. and the slow roll was set at 316° F.

It was noted that this sample did stick to the slow roll, but it was noted that the sample immediately lost tack and loosened from the roll without the use of the blade. There was no residue left on the rolls. The performance was acceptable.

Example 9

In this example, the composition was 60% ethylene methacrylic acid ionomer. The sodium ionomer, Surlyn 8920 (Dupont) was used at 20.8 g, and the zinc ionomer, Surlyn 9910 (Dupont) was used at 15.2 g. The reactive polymer, used at 40% by weight (24 g), was the terpolymer ethylene butylacrylate glycidyl methacrylate (Elvaloy AS from Dupont). On the two roll mill, the fast roll was set at 325° F. and the slow roll was set at 315° F.

It was noted that this sample went straight through the nip and did not stick to the rolls at all. There was no residue left on the rolls. The performance was acceptable.

Example 10

In this example, the composition was 55% ethylene methacrylic acid ionomer. The sodium ionomer, Surlyn 8920 (Dupont) was used at 19.0 g, and the zinc ionomer, Surlyn 9910 (Dupont) was used at 14.0 g. The reactive polymer, used at 45% by weight (27 g), was the terpolymer ethylene butylacrylate glycidyl methacrylate (Elvaloy AS from Dupont). On the two roll mill, the fast roll was set at 327° F. and the slow roll was set at 323° F.

It was noted that this sample did stick to the fast roll but was removed with the blade easily and cleanly. There was only a small residue left on the roll. This amount of residue would allow operation and would only require periodic cleaning of the roll. The performance was marginal but acceptable.

Example 11

In this example, the composition was 50% ethylene methacrylic acid ionomer. The sodium ionomer, Surlyn 8920 (Dupont) was used at 17.3 g, and the zinc ionomer, Surlyn 9910 (Dupont) was used at 12.7 g. The reactive polymer, used at 50% by weight (30 g), was the terpolymer ethylene butylacrylate glycidyl methacrylate (Elvaloy AS from Dupont). On the two roll mill, the fast roll was set at 325° F. and the slow roll was set at 315° F.

It was noted that this sample did stick to the fast roll. The sample could be taken off the roll somewhat but not cleanly. There was a residue left on the roll. This amount of residue would allow operation and would only require periodic cleaning of the roll. The performance was marginal.

I claim:

1. A welding rod for a surface covering comprising a composition which consists essentially of a reaction product of A) a partially neutralized ethylene (meth)acrylic acid ionomer and B) a polymer which contains a moiety which is reactive with the acid or neutralized acid group, wherein the polymer is present at an amount in the range of from about 10 to about 45% by weight based on the weight of A and B combined wherein further, the reaction product is sufficiently non-sticking that it can be extruded and calendered without substantial adherance to any hot metal parts.

2. The welding rod of claim 1 wherein further the composition contains an ethylene/propylene polymer rubber at an amount up to about 50% by weight of the composition.

3. The welding rod of claim 1 wherein further the composition contains a non-reactive polymer at an amount up to about 35% by weight of the compositon.

4. The welding rod of claim 1 wherein the composition further includes a plasticizer, pigments, processing aids, filler and a non-reactive polymer which would not cause sticking to hot metal parts.

5. The welding rod of claim 1 wherein the composition includes the reaction product at an amount of at least 65% by wt.

6. The welding rod of claim 1 wherein the moiety of the reactive polymer can be a member selected from the group consisting of: an epoxide, an alkylating agent, an isocyanate, an aziridine, a silane and mixtures thereof.

7. The welding rod of claim 6 wherein the moiety is an epoxide.

* * * * *